United States Patent [19]
Stiehler et al.

[11] Patent Number: 5,717,971
[45] Date of Patent: Feb. 10, 1998

[54] PHOTOGRAPHIC SYSTEM FILM DOOR LOCKING MECHANISM AND METHOD

[75] Inventors: Wayne Edward Stiehler, Spencerport; Beth Andrews O'Leary, Rochester; Anthony Samuel Raymond, Webster; Robert Louis Kuhn, Jr., Rush, all of N.Y.

[73] Assignee: Eastman Kodak Company, Rochester, N.Y.

[21] Appl. No.: 568,110

[22] Filed: Dec. 6, 1995

Related U.S. Application Data

[60] Provisional application No. 60/000,678 Jun. 29, 1995.

[51] Int. Cl.$^6$ ............................................. G03B 17/02
[52] U.S. Cl. ..................... 396/513; 396/514; 396/535; 396/538
[58] Field of Search ......................... 396/360, 511, 396/512, 513, 516, 522, 536, 538, 514

[56] References Cited

U.S. PATENT DOCUMENTS

| | | | |
|---|---|---|---|
| 4,202,614 | 5/1980 | Harvey | 354/121 |
| 5,231,438 | 7/1993 | Smart | 354/281 |
| 5,307,099 | 4/1994 | Kawamura et al. | 354/21 |
| 5,321,455 | 6/1994 | Cocca | 354/207 |
| 5,452,036 | 9/1995 | Kamata | 396/512 |
| 5,481,325 | 1/1996 | Wada et al. | 396/403 |
| 5,497,212 | 3/1996 | Kawamura et al. | 396/405 |
| 5,587,757 | 12/1996 | Seamans et al. | 396/536 |
| 5,592,253 | 1/1997 | Nishimura et al. | 396/538 |
| 5,600,393 | 2/1997 | Funahashi | 396/513 |
| 5,630,192 | 5/1997 | Kobayashi | 396/513 |

*Primary Examiner*—Eddie C. Lee
*Attorney, Agent, or Firm*—Charles E. Snee, III; David A. Howley

[57] ABSTRACT

A locking mechanism and method are provided for use in any photographic system which uses film cartridges. One embodiment includes a drive lever and an actuator which prevent movement of a slider door release, thus preventing unlocking of a film door when a film spool is improperly parked within a cartridge. Proper parking is determined by the position of a drive spindle, which operatively engages the film spool. In another embodiment, an actuator contacts a drive spindle and selectively engages a light lock driver. When the light lock driver is not engaged, the slider door release is moveable to unlock the film door. When the light lock driver is engaged, the slider door release is not moveable to unlock the film door. A user controlled mechanism may be included to properly park a film spool in the event that the photographic system improperly parks the film spool. An electro-mechanical switch may be included for properly parking the film spool. The parking switch may be used as a back-up mechanism and method to a sensor and radial bar code generally used to properly park the film spool. Or, the parking switch can be used as the primary mechanism and method for parking the film spool. Alternatively, a parking switch may be used to count the number of film spool rotations.

14 Claims, 10 Drawing Sheets

PHOTOGRAPHIC SYSTEM FILM DOOR LOCKING MECHANISM AND METHOD

CROSS-REFERENCE TO RELATED APPLICATIONS

Reference is made to and priority claimed from U.S. Provisional application Ser. No. US 60/000,678, filed Jun. 29, 1995, entitled PHOTOGRAPHING SYSTEM FILM DOOR LOCKING MECHANISM AND METHOD.

Reference is made to commonly assigned copending application Ser. Nos. 60/000,655 filed Jun. 29, 1995 and 08/568,214 filed Dec. 6, 1995 for CAMERA WITH MEANS FOR PREVENTING A CARTRIDGE LIGHTLOCK FROM MOVING FROM AN OPEN TO A CLOSED POSITION WHEN A FILMSTRIP PROTRUDES OUT OF THE CARTRIDGE and 60/000,713 filed Jun. 29, 1995 and 08/565,463 filed Nov. 30, 1995 for CARTRIDGE HANDLING SYSTEM FOR CAMERA filed on even date herewith, both of which are assigned to the assignee of this application.

FIELD OF THE INVENTION

The present invention relates to the field of photographic systems, and more specifically, to methods and mechanisms for selectively locking a film door during operations involving a film spool and/or film cartridge.

BACKGROUND OF THE INVENTION

Thrust film cartridges have been disclosed as an alternative to conventional film cartridges utilizing plush light traps. Typical thrust film cartridges include an outer shell having a longitudinally-extending opening for allowing for the exit of film from the cartridge. A cartridge spool is rotatably positioned within the outer shell to accommodate a roll of film. A light lock mechanism is mounted adjacent the opening and is movable between a closed position, wherein a light tight seal is formed, and an open position, wherein film is allowed to exit the film cartridge.

Thrust film cartridges are particularly useful for allowing rewinding and subsequent reloading of the film before the complete roll of film is used. Cameras having the ability to rewind and reload partially-used rolls of film are sometimes referred to as mid-roll interrupt cameras. Such a camera is disclosed in commonly-assigned U.S. Pat. Nos. 4,947,197 to Smart et al. and 4,965,600 to Smart et al., which are incorporated in their entirety herein by reference.

Unlike conventional film cartridges, thrust film cartridges have no film leader extending out of the cartridge to indicate that the film is unexposed. Consequently, some other means is required to indicate whether unexposed frames exist on the film contained within the film cartridge. One such means is a visual indicator visible from the exterior of a film cartridge, as disclosed in various forms in commonly-assigned U.S. Pat. Nos. 4,994,833 to Cocca, 5,321,455 to Cocca, 5,030,978 to Stoneham et. al. and 5,032,854 to Smart et. al., which are incorporated in their entirety herein by reference. Generally, a visual indicator is disposed on a film spool contained within a film cartridge and useful icons are disposed on the exterior of the film cartridge. Thus, the film spool can be rotated to align the visual indicator with the appropriate visual icon. For example, a visual indicator, such as the color white, can be aligned with icon openings on the exterior of the film cartridge, for example, specially formed openings to designate the "unexposed," "partially exposed" or "exposed" exposure statuses, to visually indicate the exposure condition of the film within the film cartridge. Similarly, film cartridges can be provided with specially formed openings for "unexposed" and "exposed" exposure statuses.

Thrust film cartridges are also useful for containing processed film. For example, the film development process can include returning to the film's owner processed film in a thrust film cartridge. The thrust film cartridge can be subsequently used in connection with equipment adapted to receive thrust film cartridges, for example, equipment which provides for the viewing of the processed film and/or printing of selected frames. In this regard, other visual indicators can be used with other icon openings to indicate other useful information, including whether the film contained within a film cartridge has been processed.

Generally, operations involving the film spool and/or film cartridge, including for example, positioning the film spool to align a visual indicator or indicators, are referred to as "parking" the film spool. Typically, the film spool is parked after the film has been completely rewound into the film cartridge.

Locking mechanisms are known which prevent opening a camera's film door when film is extended from a film cartridge. For example, commonly assigned U.S. Pat. No. 5,231,438 to Smart discloses a film plane interlock which restricts the opening of a film door when film is thrust out of a film cartridge. However, after the film is completely rewound into the film cartridge, the film plane interlock is not engaged, and does not prevent the opening of the film door. Thus, a user of a photographic system in which a film cartridge is used, such as a camera, film development equipment or equipment which provides for the viewing or printing of processed film contained within the film cartridge, could possibly open the film door and extract the film cartridge before the film spool is parked. As a result, the user may gain access to an improperly parked film spool, which could result in double exposures, lost prints or wasted film.

Similarly, after a film cartridge has been inserted into a photographic system and prior to thrusting the film into the film plane, the film plane interlock is not engaged and does not prevent the opening of the photographic system's film door. Again, the possibility arises that a photographic system user could open the film door and extract the film cartridge having an improperly parked film spool. Thus, it would be desirable to provide a locking mechanism and method which prevents the opening of a film door unless the film spool is properly parked.

The film cartridges disclosed by the above-referenced patents have a radial bar code disposed on a data disk positioned at an axial end of the film cartridge. The data disk is rotatable with the rotation of the film spool contained within the film cartridge during film advancement and rewind. The radial bar code represents information concerning the film contained within the film cartridge, including, among other things, the film speed, film type and total number of frames on the film. The radial bar code is typically read by the use of an optical sensor disposed adjacent to the radial bar code. Generally, the optical sensor and radial bar code are also utilized for parking the film spool.

In certain circumstances, the film spool may be improperly parked. This can result from many different factors, including optical sensor failure and/or misalignment of the radial bar code to the optical sensor. In the circumstance of an improperly parked film spool, a locking mechanism, which prevents the opening of a film door until the film spool is properly parked, would block the release of the film door and the photographic system user would be prevented from gaining access to the film cartridge. Consequently, it would be desirable to provide a locking mechanism and method which allow a system user to manually park a film spool. It would be advantageous to provide a mechanism and method for use by a photographic system to mechanically park a film spool.

SUMMARY OF THE INVENTION

In accordance with the present invention, a locking mechanism and method are provided for use in any photographic system which uses film cartridges, such as cameras, film development equipment or equipment which provides for the viewing and/or printing of processed film contained within a film cartridge. The locking mechanism and method are intended to prevent the user of a photographic system from unlocking a photographic system's film door to Gain access to a film cartridge before operations involving the film cartridge and/or film spool are complete. Preferably, the mechanism and method are used in a photographic system capable of film spool parking.

In accordance with one embodiment of the present invention, a photographic system includes a drive lever, an actuator, a drive spindle, a film door and a slider door release. The locking mechanism prevents the movement of the slider door release sufficient to unlock the film door when the film spool is improperly parked. Whether the film spool is properly parked is determined by the position of the drive spindle, which operatively engages the film spool. Preferably, the drive spindle includes an inner surface, that preferably corresponds to aligning a visual indicator on a film spool with the "exposed" visual icon opening, and alternatively the "partially exposed" or "exposed" visual icon openings, on the film cartridge when a film spool is engaged by the drive spindle. The drive spindle further includes an outer surface.

The drive lever is operatively connected to and moveable by the slider door release. When the slider door release is moved, the drive lever engages the actuator and causes the actuator to move. As the actuator moves, the actuator contacts the drive spindle. If the actuator contacts the outer surface, it is presumed that the film spool is improperly parked, and the actuator is prevented from moving further. As a result, the slider door release is prevented from moving sufficiently to unlock the film door. Alternatively, if the actuator does not contact the outer surface, but rather is aligned with the inner surface, it is presumed that the film spool is properly parked and the actuator moves further. As a result, the slider door release is allowed to move sufficiently to unlock the film door.

In accordance with another embodiment of the present invention, a photographic system includes an actuator, a drive spindle, a film door, a slider door release and a light lock driver. The drive spindle includes an inner surface, that preferably corresponds to aligning a visual indicator on a film spool with the "exposed" visual icon opening, and alternatively the "partially exposed" or "exposed" visual icon openings on the film cartridge when a film spool is engaged by the drive spindle. The drive spindle further includes an outer surface. The slider door release is movable for unlocking the film door and is operatively connected to the light lock driver.

Preferably, the actuator of this embodiment contacts the drive spindle and selectively engages the light lock driver in accordance with whether the actuator is contacting either the inner surface or the outer surface of the drive spindle. When the actuator contacts the inner surface, it is presumed that the film spool is properly parked and the actuator does not engage the light lock driver. As a result, the light lock driver is unlocked and does not prevent further movement of the slider door release sufficient to unlock the film door. When the actuator contacts the outer surface, it is presumed that the film spool is improperly parked and the actuator engages the light lock driver. As a result, the light lock driver is locked and prevents further movement of the slider door release sufficient to unlock the film door.

In accordance with another aspect of the present invention, a photographic system includes a user controlled mechanism to properly park a film spool in the event that the photographic system improperly parks the film spool. After the film spool parking operations have been completed, the user may attempt to unlock the film door, but may be prevented from doing so by the locking mechanism and method of the present invention if the film spool was improperly parked. Preferably, a system user interface commonly found in photographic systems, for example a rewind button, can be used to accept input to cause a drive mechanism to rotate a drive spindle a predetermined angular distance smaller than the angular distance of the inner surface. Preferably, the predetermined angular distance is 30 degrees. After causing the drive spindle to rotate, the system user can again attempt to unlock the film door by moving the slider door release. If the slider door release is prevented from moving a sufficient distance to unlock the film door, the system user can press the rewind button again and attempt again to unlock the film door. The system user can keep iterating these steps until the inner surface aligns with the actuator, to allow actuator rotation, and thus, slider door release movement sufficient to unlock the film door. Alternatively, a crank lever can be provided which allows a user to manually cause the drive spindle to rotate a predetermined angular distance.

In accordance with another aspect of the present invention, a photographic system includes an electromechanical switch for properly parking the film spool. In one embodiment, the parking switch is used as a backup mechanism and method to the sensor and radial bar code generally used to properly park the film spool. Alternatively, a parking switch is used as the primary mechanism and method for parking the film spool. Alternatively, a parking switch is used to count the number of film spool rotations.

The parking switch includes a parking lever, a spring and a coil. The spring includes a first end and first contact point and the coil includes a second contact point. The parking lever is moveable between a closed position, where the first end contacts the coil, and an open position, where the first end does not contact the coil. Preferably, the parking lever is in the closed position when the film spool is positioned to align the visual indicator on the film spool with the "exposed" visual icon opening on the film cartridge, and alternatively, to align the visual indicator with either the "partially exposed" or "exposed" visual icon opening on the film cartridge.

In accordance with another aspect of the present invention, the parking lever slidably contacts at least a portion of the drive spindle. Preferably, the drive spindle includes a second outer surface, and a cutout surface. Preferably, the cutout surface corresponds to aligning the visual indicator with the "exposed" visual icon opening on the film cartridge; and alternatively, the "partially exposed" or "exposed" visual icon openings on the film cartridge, when the film spool engages the drive spindle. Preferably, as the parking lever contacts the outer surface, the parking lever is in the open position, and when the cutout surface is aligned with the parking lever, the parking lever is in the closed position.

In accordance with another aspect of the present invention, a parking switch includes a pad, a first contact point and a second contact point. The pad is moveable between a closed position and an open position. Preferably, the pad is in the open position when the actuator contacts the outer surface of the drive spindle and, as a result, the actuator does not contact the pad, but rather engages the light lock driver. As a consequence, it is presumed that the film spool is not properly parked and no electrical connection is made between the first contact point and the second contact point. Preferably, the pad is in the closed position when the actuator contacts the inner surface of the drive spindle and contacts the pad, thereby causing the pad to move to the closed position. As a consequence, it is presumed that the film spool is properly parked and an electrical connection is made between the first contact point and the second contact point.

DETAILED DESCRIPTION

A locking mechanism and method according to the present invention are for use in any photographic system which uses film cartridges, such as cameras, film development equipment or equipment which provides for the viewing and/or printing of processed film contained within a film cartridge. The locking mechanism and method are intended to prevent the user of a photographic system from unlocking a photographic system's film door to gain access to a film cartridge before operations involving the film cartridge and/or film spool are completed. Preferably, the mechanism and method are used in a photographic system capable of film spool parking.

One embodiment of the locking mechanism according to the present invention includes a drive lever 20 and a actuator 30, shown in FIGS. 1–5 with other components of a photographic system 10. The drive lever 20 includes an arm 22 and a hook 24 and is rotatable about a drive lever pivot point 26. The actuator 30 includes a slot 32, a first tab 34 and a second tab 36 and is rotatable about a actuator pivot point 38. The slot 32 allows the actuator 30 to rotate about the actuator pivot point 38 despite the presence of a light lock driver 80.

As shown in FIG. 1–5, the remaining components of the photographic system 10 include a drive spindle 40, a film door 50, a slider door release 60, a detent lever 70, the light lock driver 80 and a latch plate 90. The film cartridge door 50 covers an opening of a loading chamber (not shown) designed to receive a film cartridge (not shown) endwise, i.e. axially, through the opening and into the interior of the loading chamber. As is known, when a film cartridge is fully seated in a loading chamber and the film door 50 is locked, the film spool (not shown) contained within the film cartridge operatively engages the drive spindle 40 and the film cartridge is considered loaded. Preferably, the film cartridge is a thrust film cartridge and the light lock driver 80 is used to move the film cartridge's light lock mechanism between an open position and a closed position.

The drive spindle 40 includes an inner surface 42 and an outer surface 44. Preferably, the inner surface 42 corresponds to aligning a visual indicator on the film spool with the "exposed" visual icon opening on the film cartridge when the film cartridge is fully seated in the loading chamber. Alternatively, the inner surface 42 corresponds to the visual indicator being aligned to either the "partially exposed" or "exposed" visual icon openings.

The slider door release 60 is slidably positioned for movement in the opposite directions O and C and includes a latch pin 62 engageable by drive lever 20 and a ramp tab 64 engagable by the detent lever 70. Preferably, the slider door release 60 is biased against movement in the direction O by a spring (not shown) unless the force of the spring is overcome by some external force, for example, a system user moving the slider door release 60 in the direction O. Preferably, the force of the spring returns the slider door release 60 to its original position when the external force is removed from the slider door release 60. The detent lever 70 includes a first notch 72 and is rotatable about a detent lever pivot point 74. A latch plate 90 is operatively connected to the film door 50 and is movable between latched and unlatched positions to allow the film door 50 to be locked or unlocked. The latch plate 90, which is operatively connected to the detent lever 70, is moveable in the directions L and U by rotation of the detent lever 70 about the detent lever pivot point 74 due to the ramp tab 64 selectively engaging a ramp next to the first notch 72 when the slider door release 60 is moved in the direction O.

Figure 1:
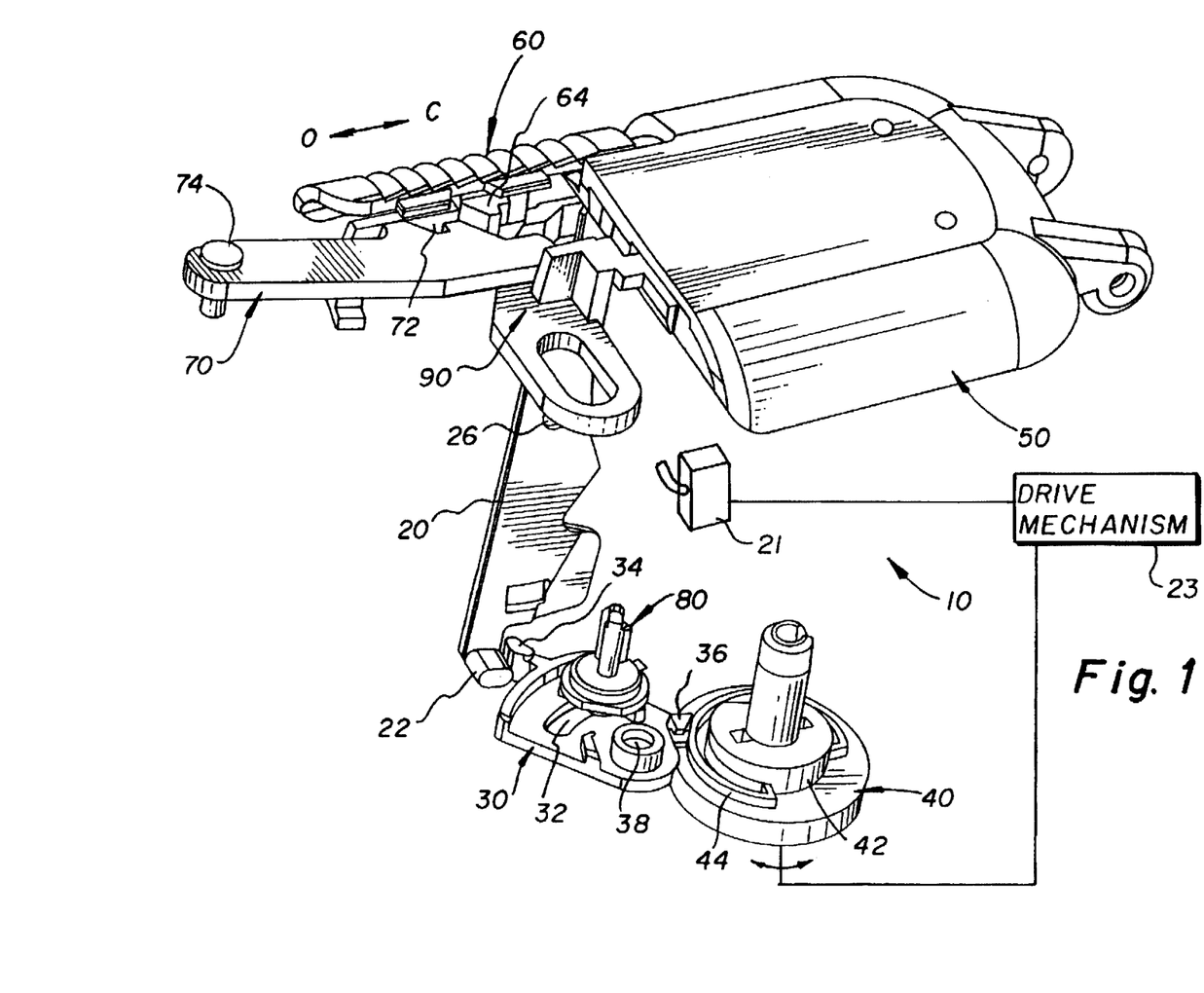
FIG. 1 is perspective top view of the components of a cartridge receiving device showing one embodiment of the present invention.
Figure 2:
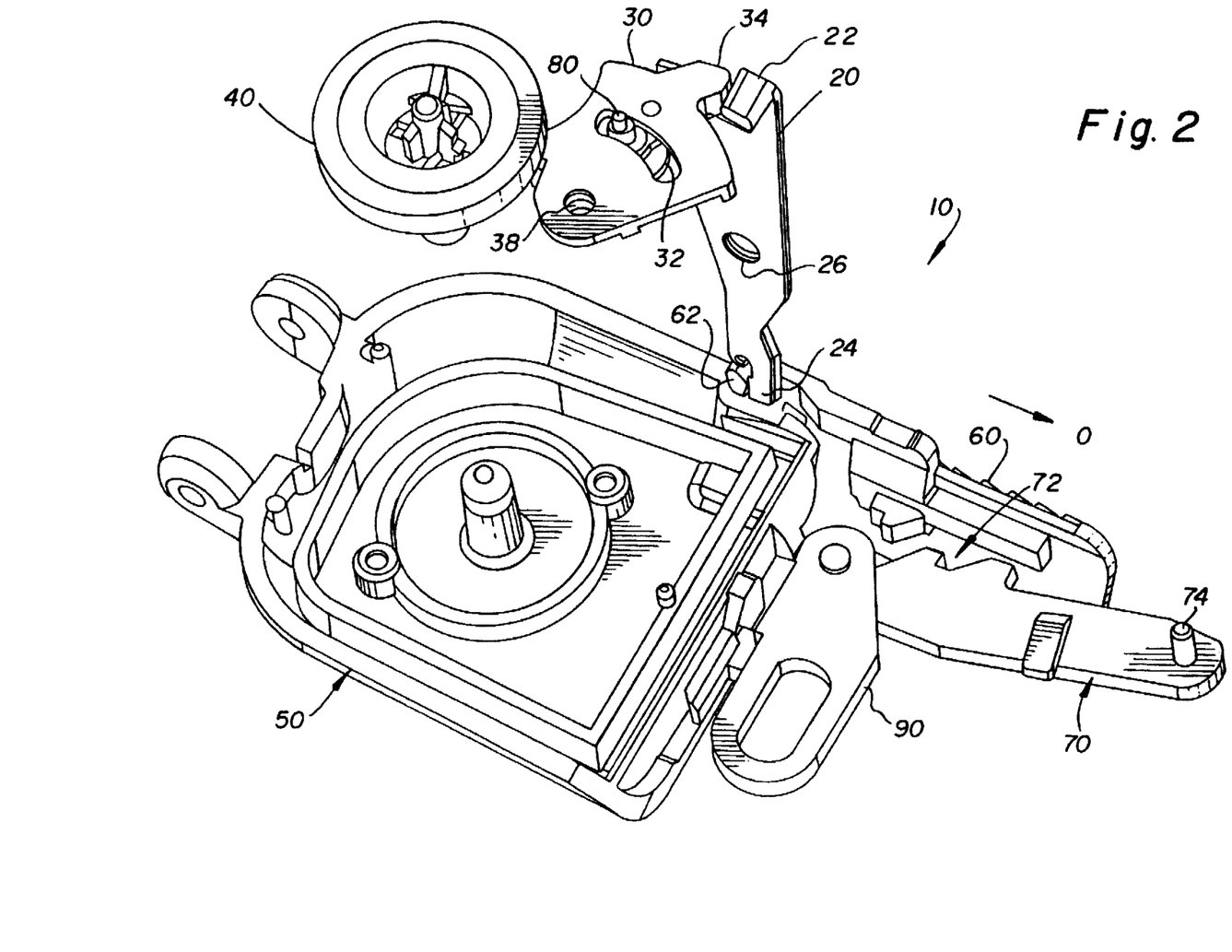
FIG. 2 is a perspective bottom view of the components shown in FIG. 1.
Figure 3:
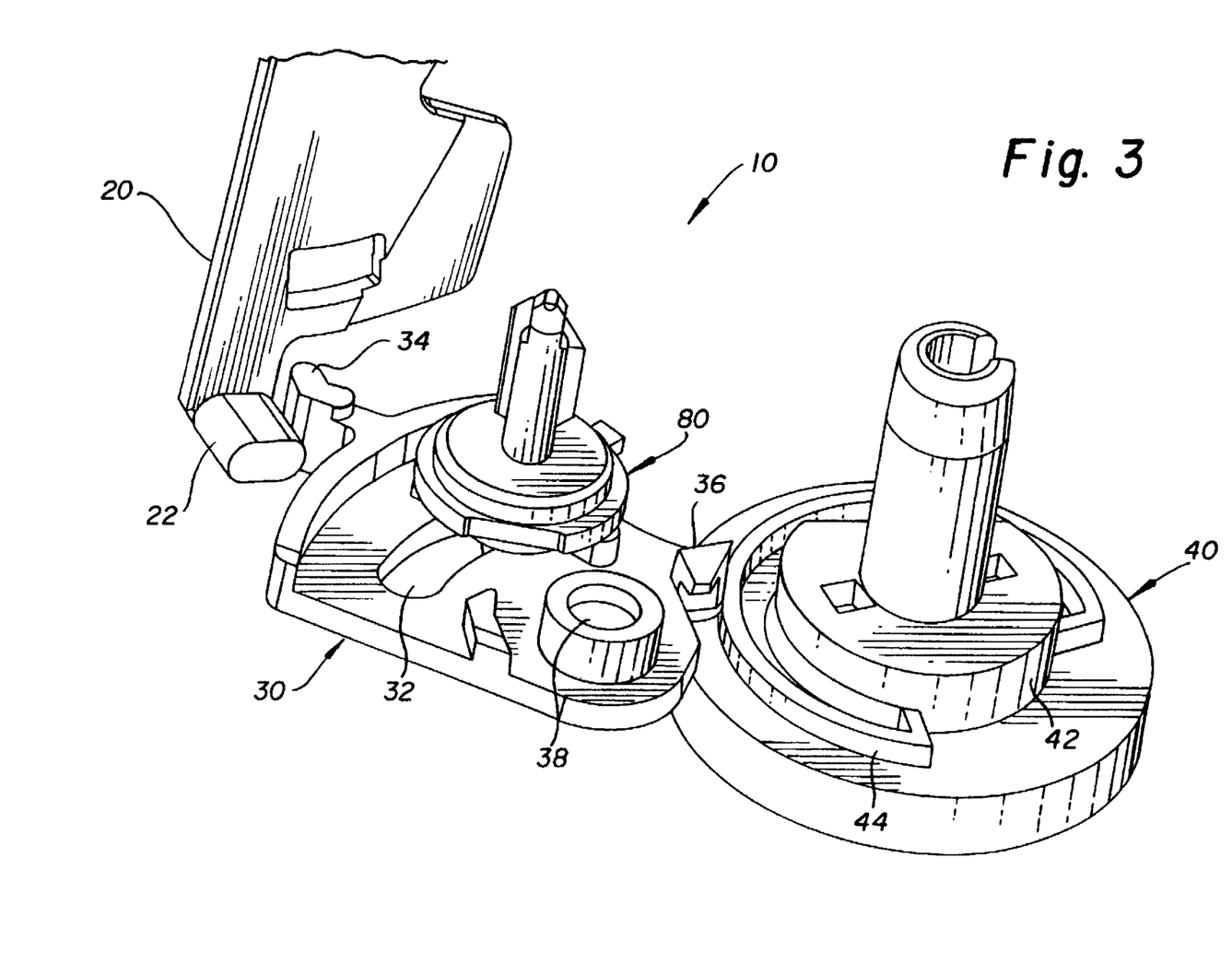
FIG. 3 is a perspective view of the components shown in FIG. 1, showing the actuator engaging the outer surface of the drive spindle.

As shown in FIG. 2, the latch pin 62 of the slider door release 60 engages the hook 24 of drive lever 20 and the drive lever 20 is rotatable about the drive lever pivot point 26 when the slider door release 60 is moved in the direction O. As shown in FIGS. 1–3, the first tab 34 of the actuator 30 is engagable by the arm 22 of the drive lever 20. Preferably, the drive lever 20 does not engage the actuator 30 prior to movement of the slider door release 60 in the direction O. Rotation of the drive lever 20 causes the drive lever 20 to apply a clockwise torque (with respect to FIG. 1) on the actuator 30 about the actuator pivot point 38. Preferably, the actuator 30 is biased to rotate counter clockwise about the actuator pivot point 38 under the urging of a spring (not shown). In view of the torque applied by the drive lever 20, the actuator 30 is rotatable clockwise about the actuator pivot point 38 by the drive lever 20.

The position of the drive spindle 40 when the slider door release 60 is moved in the direction O determines whether the actuator 30 is allowed to continue to rotate and thereby allow the slider door release 60 to be further moved in the direction O sufficient to unlock the film door 50. Preferably, the drive spindle 40 is stationary when the actuator 30 rotates. For example, when a system user attempts to unlock the film door 50 before the film spool has been parked, the movement of the slider door release 60 will cause the drive lever 20 to rotate counter clockwise (with respect to FIG. 1) about the drive lever pivot point 26. Preferably, the rotation of the drive lever 20 triggers a switch 21 that deactivates a drive mechanism 23 (shown schematically) for example a motor, used to rotate the drive spindle 40. As a result, the rotation of the drive spindle 40 ceases and the drive spindle 40 becomes stationary. It should be noted that when a system user attempts to unlock the film door 50 after the film spool has been parked, the drive spindle 40 is stationary. Alternatively, the actuator 30 can engage a rotating drive spindle 40 and the excess drag of the actuator 30 can be used to stall the drive mechanism.

As noted above, the inner surface 42 of the drive spindle 40 corresponds to aligning the visual indicator or indicators with the appropriate visual icon openings. If the inner surface 42 is aligned with the actuator 30 to allow further rotation of the actuator 30, the film spool is presumed to be properly parked and the film door 50 can be unlocked. Alternatively, if the inner surface 42 is not aligned with the actuator 30 to allow further rotation of the actuator 30, the film spool is presumed improperly parked and the film door 50 remains locked.

Figure 4:
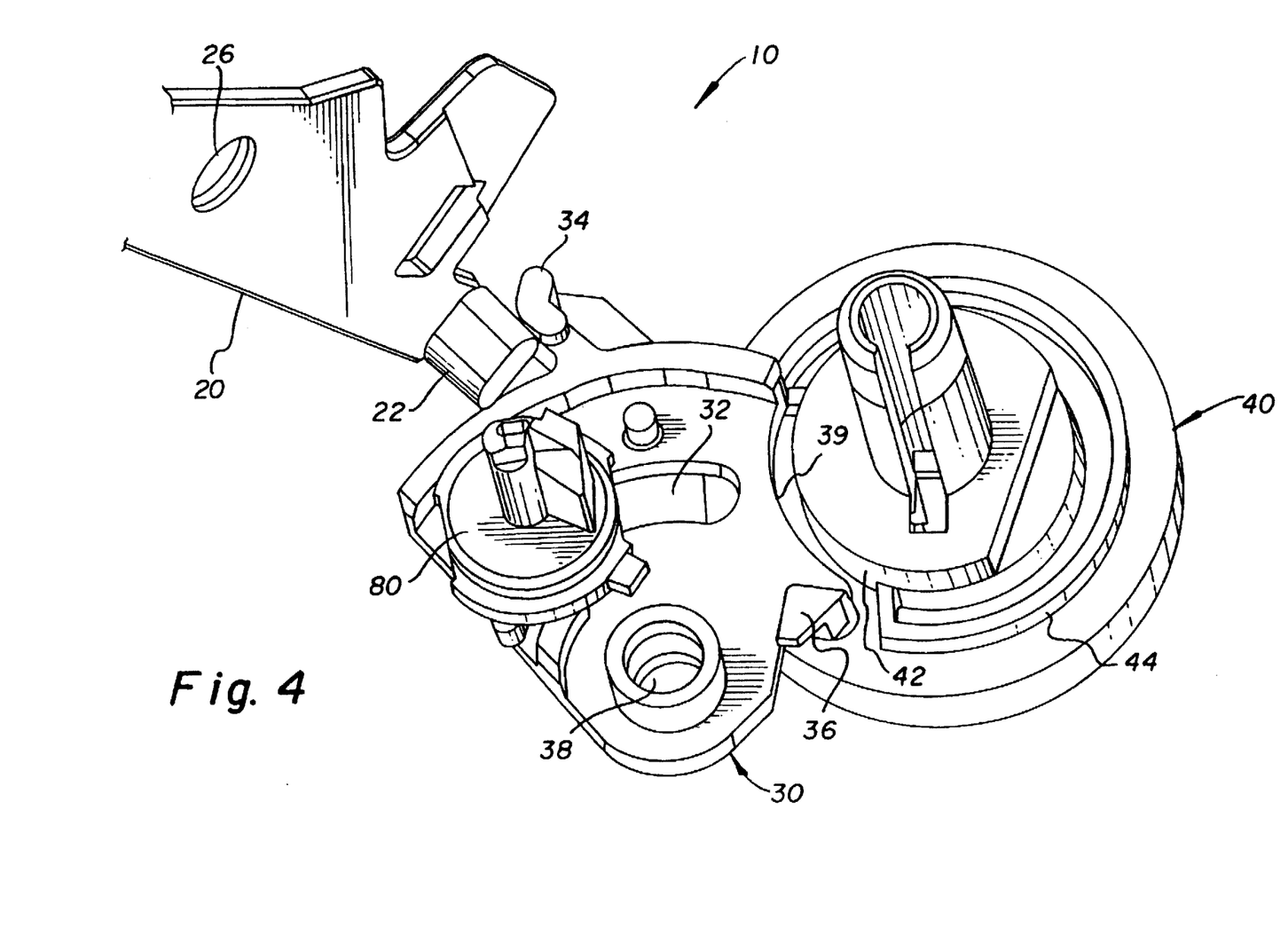
FIG. 4 is a perspective view of the components shown in FIG. 1, showing the actuator engaging the inner surface of the drive spindle.
Figure 5:
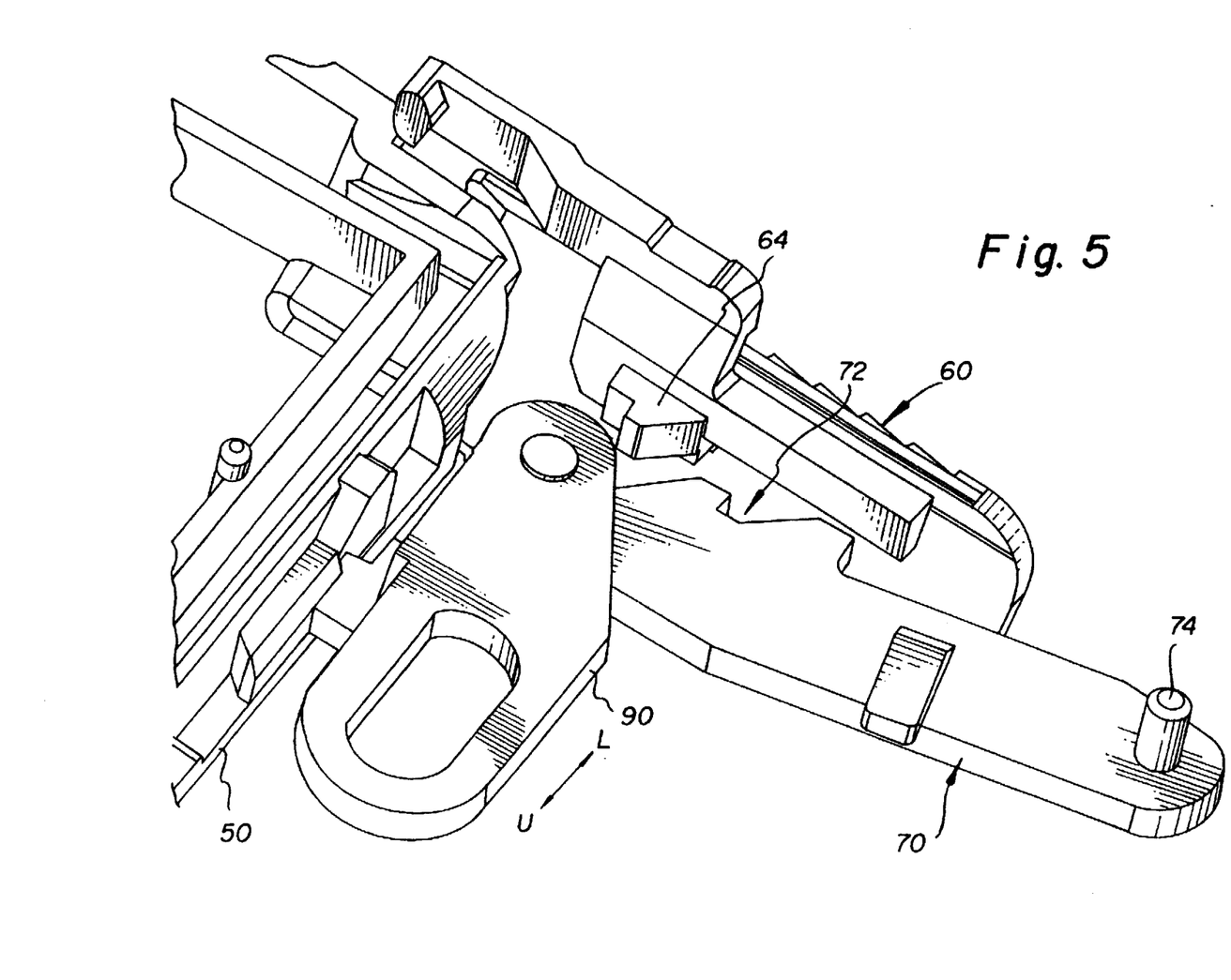
FIG. 5 is a perspective view of the components shown in FIG. 1, showing the slider door release, detent lever and latch plate.
Figure 6:
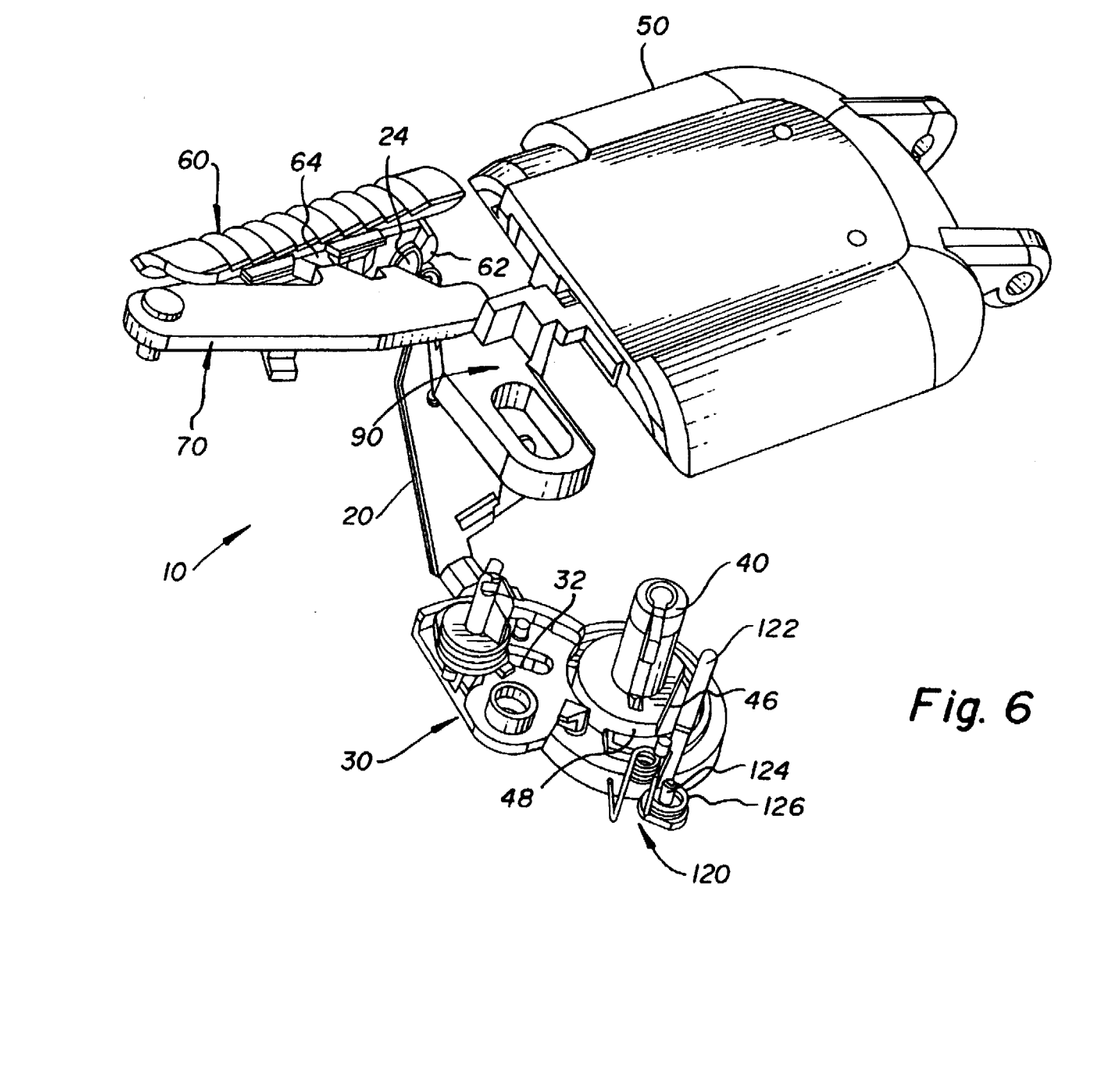
FIG. 6 is a perspective view of the components shown in FIG. 1, showing the parking lever of the parking switch in the closed position.

As shown in FIGS. 4 and 6, the position of the inner surface 42 of the drive spindle 40 indicates that the film spool (not shown) is properly parked. Thus, the locking mechanism of the present invention allows further movement of the slider door release 60 in the direction O sufficient to unlock the film door 50. As the actuator 30 rotates clockwise about the actuator pivot point 38, the second tab 36 does not contact the outer surface 44 of the drive spindle 40. As a result, the actuator 30 continues to rotate clockwise about the actuator pivot point 38 due to the torque applied to the actuator 30 by the drive lever 20. Eventually, the actuator 30 is prevented from rotating further clockwise by the light lock driver 80 contacting the inner portion of the slot 32. As shown in FIGS. 4 and 6, the curved surface 39 of the actuator 30 aligns with the inner surface 42 of the drive spindle 40. Preferably, the curved surface 39 of the actuator 30 does not contact the inner surface 42 of the drive spindle 40. It should be appreciated that in the circumstance that the system user attempts to unlock the film door 50 while the photographic system is parking the film spool, this embodiment will allow the system user to unlock the film door 50 if the drive spindle 40 becomes stationary in a position indicating that the film spool is properly parked. It should be further appreciated that when the inner surface 42 corresponds to either the "partially exposed" or exposed" visual icon openings, this embodiment of the locking mechanism will not differentiate between these visual icon openings if the inner surface 42 is properly aligned with the actuator 30.

Alternatively, as shown in FIGS. 1 and 3, the position of the inner surface of the drive spindle 40 indicates that the film spool (not shown) is not properly parked. Thus, the locking mechanism of the present invention prevents sufficient movement of the slider door release 60 in the direction O necessary to unlock the film door 50. As the actuator 30 rotates, the second tab 36 contacts the outer surface 44 of the drive spindle 40 and, consequently, the actuator 30 is prevented from further rotating clockwise about the actuator pivot point 38. Preferably, the second tab 36 does not contact the outer surface 44 until the actuator 30 is caused to rotate due to the torque applied by the drive lever 20. As a result, the drive lever 20 cannot rotate about the drive lever pivot point 26 and, thus, the slider door release 60 is not moveable in the direction O to unlatch the film door 50.

When a system user attempts to unlock the film door 50 before the film spool has been parked, and the drive spindle 40 becomes stationary in a position which indicates that the film spool is improperly parked, the drive mechanism (not shown) remains inactive until the external force applied to the slider door release 60 is released. Specifically, when the external force on the slider release door 60 is released, the drive lever 20 rotates clockwise (with respect to FIG. 1) and trips a switch (not shown) which causes the drive mechanism to become reactivated. Upon reactivation, the drive spindle 40 rotates. Preferably, film spool parking operations continue. It should be appreciated that the above described sequence will be repeated if a system user again attempts to unlock the film door 50 before the film spool has been parked. Similarly, the above described sequence will occur when the system user attempts to unlock the film door 50 after loading the film cartridge and before the film has been thrusted from the film cartridge.

Figure 8:
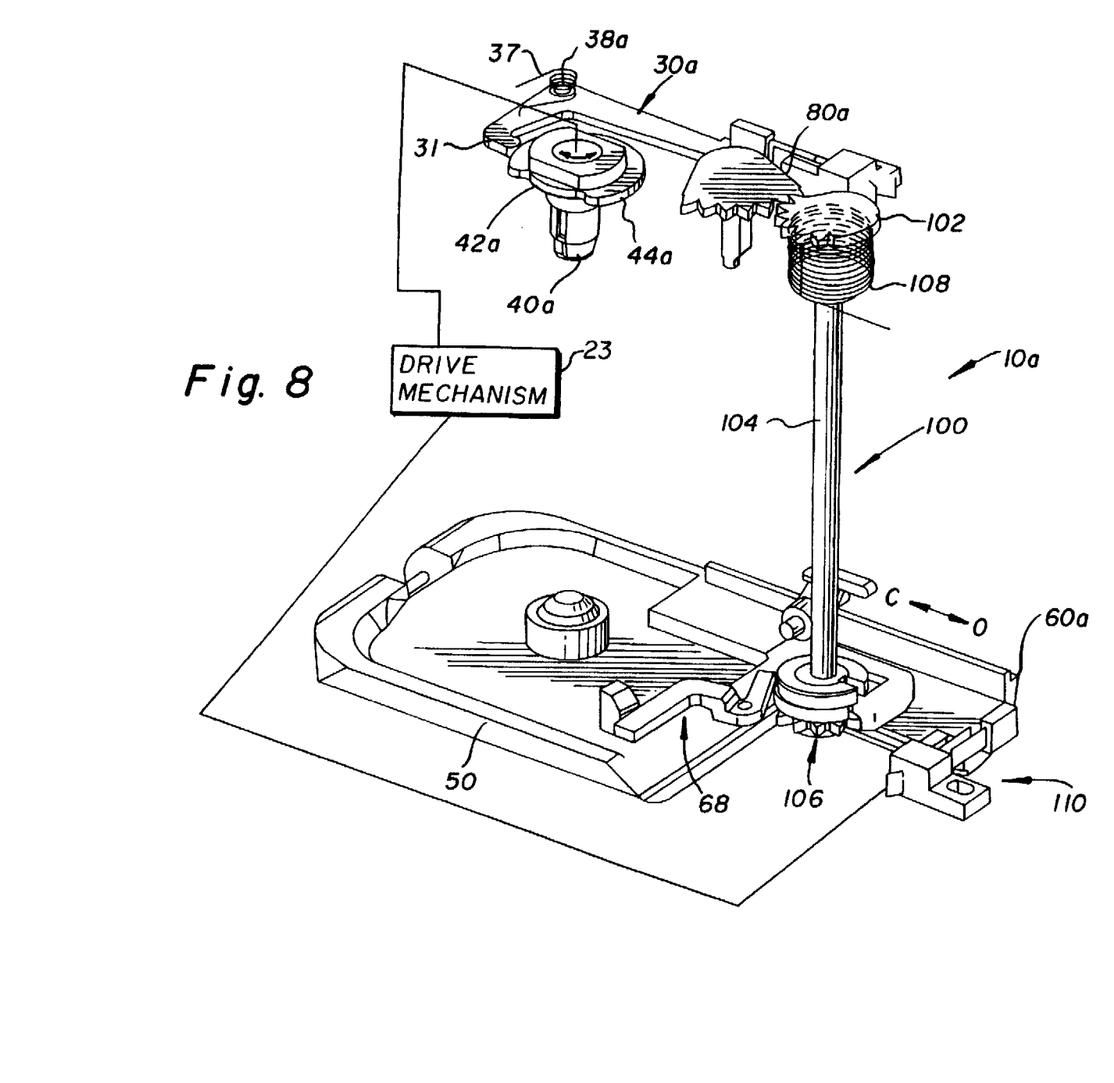
FIG. 8 is perspective view of the components of a cartridge receiving device showing an alternative embodiment of the present invention.
Figure 9:
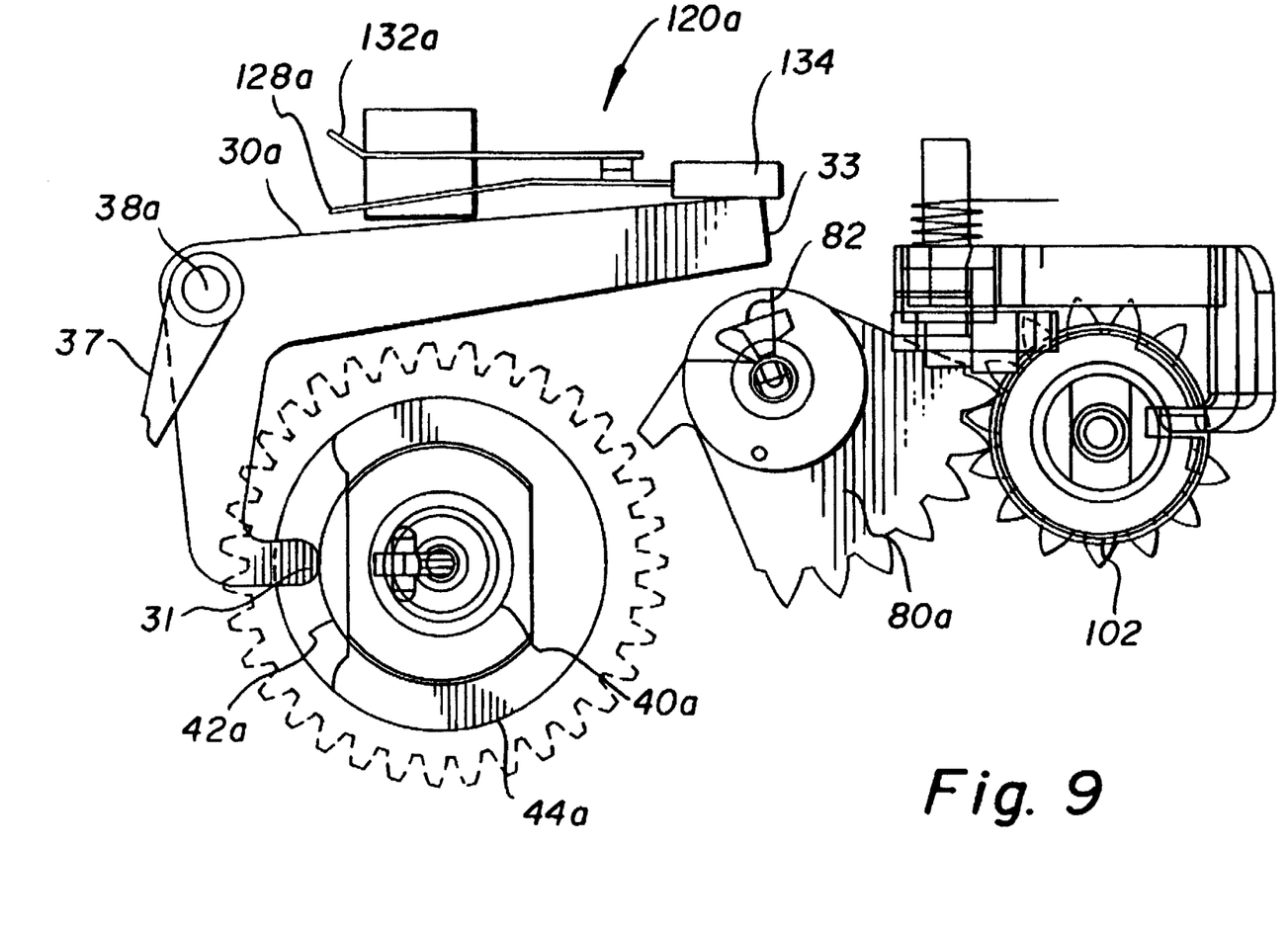
FIG. 9 is a top view of the components shown in FIG. 8, showing the lever disengaged from the light lock driver.
Figure 10:
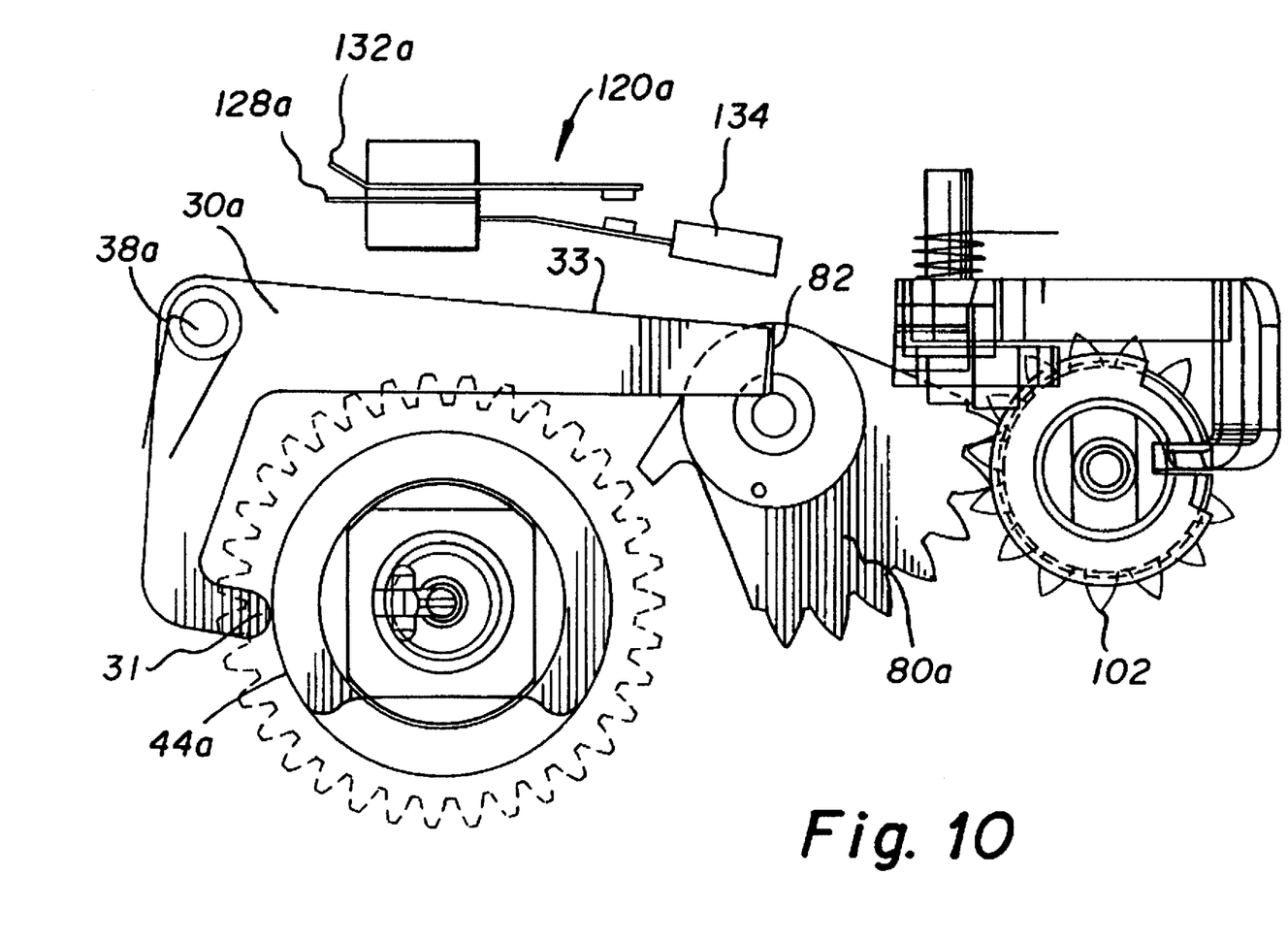
FIG. 10 is a top view of the components shown in FIG. 8, showing the lever engaging the light lock driver.

An alternative embodiment of the locking mechanism of the present invention includes an actuator 30a, shown in FIGS. 8–10 with other components of a photographic system 10a. The actuator 30a includes a pawl 31 and a first end 33 and is rotatable about a actuator pivot point 38a. The remaining components of the photographic system 10a include a drive spindle 40a, a film door 50, a slider door release 60a, a light lock driver 80a and a drive gear assembly 100. The film cartridge door 50 covers an opening of a loading chamber (not shown) designed to receive a film cartridge (not shown) endwise, i.e. axially, through the opening and into the interior of the loading chamber. As is known, when a film cartridge is fully seated in the loading chamber and the film door 50 is locked, the film spool (not shown) contained within the film cartridge operatively engages the drive spindle 40a and the film cartridge is considered loaded. The gear teeth of the drive spindle 40a are not shown in FIG. 8. Preferably, the film cartridge is a thrust film cartridge and the light lock driver 80a is used to move the light lock mechanism (not shown) between an open position and a closed position.

The drive spindle 40a includes an inner surface 42a and an outer surface 44a. Preferably, the inner surface 42a corresponds to aligning a visual indicator on the film spool with the "exposed" visual icon opening on the film cartridge when the film cartridge is fully seated in the loading chamber. Alternatively, the inner surface 42a corresponds to aligning a visual indicator on the film spool with either the "partially exposed" or "exposed" visual icon openings on the film cartridge when the film cartridge is fully seated in the loading chamber. The drive gear assembly 100 includes a drive gear portion 102, a shaft 104 and a first gear 106, and is rotatable about the shaft 104. Preferably, the drive gear assembly 100 is biased for rotation in the counter clockwise direction under the urging of a driver spring 108.

The slider door release 60a is slidable for movement in the opposite directions O and C and includes a latch gear portion (not shown). Preferably, the slider door release 60a is biased against movement in the direction O by a spring (not shown) unless the force of the spring is overcome by some external force, for example, a system user moving the slider door release 60a in the direction O. Preferably, the force of the spring returns the slider door release 60a to its original position when the external force is removed from the slider door release 60a. The door latch 68 is operatively attached to the film door 50 and is movable between latched and unlatched positions to allow the film door 50 to be either locked or unlocked.

The latch gear portion of the slider door release 60 meshes with the first gear 106 of the drive gear assembly 100. Thus, the drive gear assembly 100 is clockwise rotatable about the shaft 104 when the slider release door 60a is moved in the direction O. The drive gear portion 102 is meshed with the light lock driver 80a and, thus, the light lock driver 80a is rotatable by the drive gear portion 102. The pawl 31 of the actuator 30a contacts the drive spindle 40a. Preferably, the actuator 30a is biased for counter clockwise rotation about the actuator pivot point 38a under the urging of an actuator spring 37. The first end 33 of the actuator 30a selectively engages the first notch 82 of the light lock driver 80a in accordance with whether the pawl 31 is contacting the inner surface 42a or the outer surface 44a. As shown in FIG. 9, when the pawl 31 contacts the inner surface 42a, the first end 33 does not engage the first notch 82 and the light lock driver 80a becomes rotatable. As shown in FIG. 10, when the pawl 31 contacts the outer surface 44a, the first end 33 engages the first notch 82 and, as a result, the light lock driver 80a is locked and prevented from rotating and, as a consequence, the film door 50 cannot be unlocked.

The position of the pawl 31 on the drive spindle 40a when the slider door release 60a is moved in the direction O determines whether the slider door release 60a is allowed to be moved in the direction O sufficient to unlock the film door 50. Preferably, the drive spindle 40a is stationary when the system user attempts to unlock the film door 50. For example, when the system user attempts to unlock the film door 50 before the film spool has been parked, the movement of the slider door release 60a can trigger a latch switch 110 that deactivates a drive mechanism (not shown), for example a motor, used to rotate the drive spindle 40a. As a result, the rotation of the drive spindle 40a ceases and the drive spindle 40a becomes stationary. It should be noted that when a system user attempts to unlock the film door 50 after the film spool has been parked, the drive spindle 40a is stationary. Alternatively, the actuator 30a can engage a rotating drive spindle 40 and the excess drag of the actuator 30 can be used to stall the drive mechanism.

As noted above, the inner surface 42a of the drive spindle 40a corresponds to aligning the visual indicator or indicators with the appropriate visual icon openings. If the inner surface 42a is aligned with the pawl 31 of the actuator 30, the film spool is presumed to be properly parked and the film door 50 can be unlocked. Alternatively, if the inner surface 42a is not aligned with the pawl 31 of the actuator 30, the film spool is presumed improperly parked and the film door 50 remains locked.

As shown in FIG. 9, the position of the inner surface 42a indicates that the film spool (not shown) is properly parked. Thus, the alternative embodiment of the locking mechanism allows further movement of the slider door release 60a in the direction O sufficient to unlock the film door 50. The pawl 31 is shown contacting the inner surface 42a of the drive spindle 40a. In this position, the first end 33 does not engage the first notch 82 and, as a consequence, the light lock driver 80a is rotatable by the drive gear portion 102. Thus, further movement of the slider door release 60a in the direction O is not prevented by the light lock driver 80a. It should be appreciated that in the circumstance that the system user attempts to unlock the film door 50 while the photographic system is parking the film spool, this embodiment will allow the system user to unlock the film door 50 if the drive spindle 40a becomes stationary in a position indicating that the film spool is properly parked. It should be further appreciated that when the inner surface 42a corresponds to either the "partially exposed" or exposed" visual icon openings, this alternative embodiment of the locking mechanism will not differentiate between these visual icon openings if the inner surface 42a is properly aligned with the actuator 30a.

Alternatively, as shown in FIG. 10, the position of the inner surface 42a indicates that the film spool (not shown) is not properly parked. Thus, this alternative embodiment of the locking mechanism of the present invention prevents further movement of the slider door release 60a in the direction O sufficient to unlock the film door 50. The pawl 31 is shown contacting the outer surface 44a of the drive spindle 40a. In this position, the first end 33 engages the first notch 82, and, as a consequence, the light lock driver 80a is locked and not rotatable by the drive gear portion 102. Thus, further movement of the slider door release 60a in the direction O is prevented by the light lock driver 80a.

When a system user attempts to unlock the film door 50 before film spool parking has been completed and the drive spindle 40a has become stationary in a position in which the film spool was improperly parked, the drive mechanism 22 used to rotate the drive spindle 40a remains inactive until the external force applied to the slider door release 60a is released. When the external force on the slider release door 60a is released, the slider door release 60a triggers the latch switch 110 which causes the drive mechanism to become reactivated. Upon reactivation, the drive spindle 40a rotates. Preferably, film spool parking operations continue. It should be appreciated that the above described sequence will be repeated if a system user again attempts to unlock the film door 50 before the film spool has been parked.

With regard to either embodiment of the locking mechanism of the present invention, a circumstance can occur where film spool parking operations have been completed and the drive spindle 40 has become stationary in a position in which the film spool was improperly parked. In this circumstance, the locking mechanism of the present invention will prevent a system user from unlocking the film door 50 without additional steps for properly parking the film spool.

Preferably, the photographic system 10 of the present invention includes a user controlled mechanism for properly parking a film spool. Preferably, a system user interface commonly found in photographic systems, for example a rewind button, can be used to accept system user input to cause a drive mechanism to rotate a drive spindle 40a a predetermined angular distance. For example, a system user can press the rewind button to cause the drive spindle 40a to rotate a predetermined angular distance smaller than the angular distance of the inner surface 42. Preferably, the predetermined angular distance is 30 degrees. After causing the drive spindle 40a to rotate, the system user can again attempt to unlock the film door 50 by moving the slider door release 60a in the direction O. If slider door release 60a is prevented from moving a sufficient distance in the direction O to unlock the film door 50, the system user can press the rewind button again and attempt again to unlock the film door 50. The system user can keep iterating these steps until the inner surface 42a aligns with the actuator 30a to allow sufficient movement of slider door release 60a in the direction O to unlock the film door 50. Using the preferred predetermined angular distance of 30 degrees, up to 11 iterations can occur before the actuator 30a is aligned with the inner surface 42a and the slider door release 60a is allowed to move in the direction O sufficient to unlock the film door 50. Alternatively, a crank lever (not shown) can be provided which allows a system user to manually cause the drive spindle 40a to rotate a predetermined angular distance.

In accordance with another aspect of the present invention, a photographic system includes an electromechanical switch to park the film spool. In one embodiment, a parking switch 120 (FIG. 6 and 7) is used as a back-up mechanism and method to the sensor and radial bar code generally used to park the film spool. Alternatively, a parking switch 120 is employed as the primary mechanism and method for parking the film spool.

Figure 7:
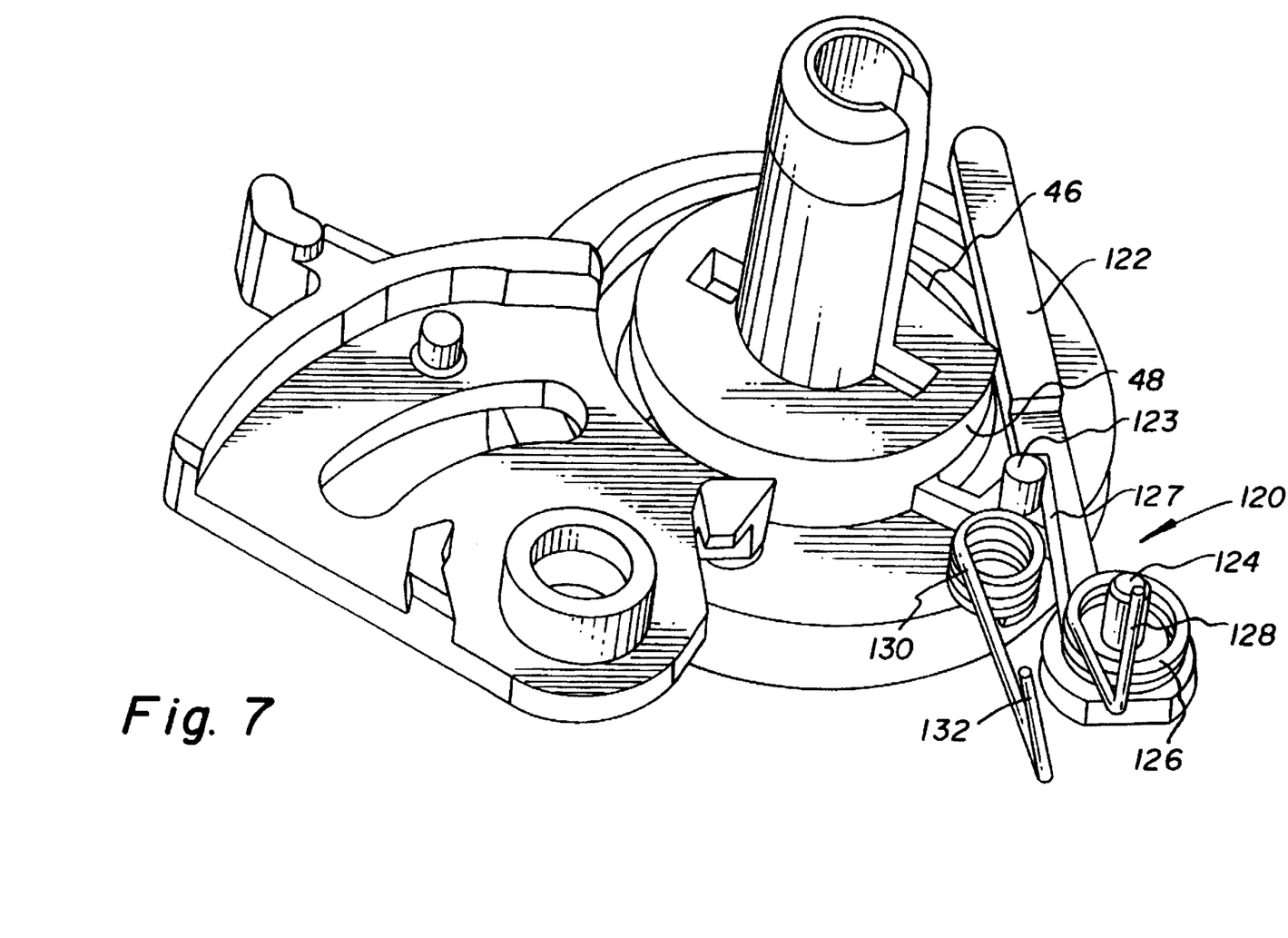
FIG. 7 is perspective view of the parking switch showing the parking lever in the open position.

As shown in FIGS. 6–7, a parking switch 120 includes a parking lever 122, rotatable about a lever pivot point 124, a parking spring 126 and a coil 130. The parking lever further includes a pin 123. The parking spring 126 includes a first end 127 and a first contact point 128. Preferably, the parking spring 126 is gold plated beryllium copper. In an alternative embodiment of the parking switch 120, the parking lever 122 can be replaced by extending the first end 127 of the parking spring 126. Preferably, the first end 127 of the parking spring 126 contacts the pin 123 and, as a result, the parking lever 122 is biased to rotate counter clockwise about the lever pivot point 124 under the urging of the parking spring 126. The coil 130 includes a second contact point 132. Preferably, the coil 130 is gold plated beryllium copper. Preferably, the first contact point 128 and the second contact point 132 are electrically connected to a circuit board (not shown).

The parking lever 122 is moveable between an open position and a closed position. Preferably, when the parking lever 120 is in the closed position, the first end 127 of the parking spring 126 contacts the coil 130. As a consequence, the first contact point 128 and the second contact point 132 are electrically connected via the circuit board (not shown). Preferably, when the parking lever 120 is in the open position, the first end 127 of the parking spring 126 does not contact the coil 130. As a consequence, the first contact point 128 and the second contact point 132 are not electrically connected. Preferably, the parking lever 122 is in the closed position when the film spool (not shown) is positioned to align the visual indicator on the film spool with the "exposed" visual icon opening on the film cartridge (not shown). Alternatively, the parking lever 122 is in the closed position when the film spool (not shown) is positioned to align the visual indicator on the film spool with either the "partially exposed" or "exposed" visual icon opening on the film cartridge.

In accordance with the preferred embodiment of the parking switch 120, the parking lever 122 slidably contacts at least a portion of the drive spindle 40. Preferably, the drive spindle 40 includes a second outer surface 48, and a second inner cutout surface 46. Preferably, the cutout surface 46 corresponds to aligning the visual indicator with the "exposed" visual icon opening on the film cartridge (not shown) when the film spool engages the drive spindle 40. Alternatively, the cutout surface 46 corresponds to the film spool positioned to align the visual indicator with either the "partially exposed" or "exposed" visual icon openings on the film cartridge when the film spool engages the drive spindle 40. Preferably, as shown in FIG. 7, as the parking lever 122 engages the second outer surface 48, the parking lever 122 is in the open position. Preferably, as shown in FIG. 6, when the cutout surface 46 is aligned with the parking lever 122, the parking lever 122 is in the closed position. It should be appreciated that the parking switch 120 is only turned "on" when the film spool is properly parked. It should also be appreciated that the "on"/"off" sequence of the parking switch 120 can be reversed.

Although the parking switch is shown in FIG. 6 in combination with the locking mechanism described above, it should be noted that the operation of the preferred embodiment of the parking switch 120 is not dependent on the operation of the locking mechanism. Consequently, the parking switch 120 can be used as a primary mechanism and method for selectively locking or unlocking the photographic system's film door 50. For example, a control mechanism such as a microprocessor (not shown) can be provided that monitors the parking switch 120. If the parking switch 120 turns "on" (thereby indicating the film spool is properly parked), the control mechanism can cause the slider door release 60 to be moveable sufficient to open the film door 50. Alternatively, if the parking switch 120 is "off" (thereby indicating the film spool is not properly parked), the control mechanism can cause the slider door release 60 to be restricted from movement sufficient to open the film door 50.

It should also be appreciated that the preferred embodiment of the parking switch 120 can be used to backup or replace the sensor and radial bar code mechanism and method generally used to park the film spool. For example, a control mechanism (not shown) can be used to monitor the parking switch 120. When the parking switch 120 turns "on" (thereby indicating the film spool is positioned to be properly parked), the control mechanism can cause the braking of a drive mechanism (not shown) used to rotate the drive spindle 40. As a consequence, the drive spindle 40 ceases to rotate and the film spool becomes stationary in a position where the film spool is properly parked.

It should also be appreciated that the preferred embodiment of the parking switch 120 can be used to ensure that the drive spindle 40 is positioned to allow for the opening of the film door 50 after the photographic system is awakened after periods of nonuse. For example, the system user can initiate rewinding of the film and elect to not unlock the film door 50 to remove the film cartridge; or remove the film cartridge and lock the film door 50 with no film cartridge present in the loading chamber. In either circumstance, events can occur that cause the drive spindle 40 to inadvertently rotate out of alignment with the actuator 30 and, as a result, the system user would be unable to unlock the film door 50. To alleviate this circumstance, the parking switch 120 can be used to verify that the drive spindle is properly positioned to allow for the opening of the film door 50 and, if not, the parking switch can be used to rotate the drive spindle 40 to a position that would allow for the opening of the film door 50.

It should also be appreciated that the preferred embodiment of the parking switch 120 can be used to count film spool rotations. For example, the parking switch turns "on" once every complete rotation of the drive spindle 40. As one rotation of the drive spindle 40 corresponds to one rotation of the film spool, the parking switch 120 can be used as a counter based on the number of times the parking switch 120 turns "on."

An alternative embodiment of a parking switch 120a, as shown in FIGS. 9–10, includes a pad 134, a first contact point 128a and a second contact point 132a. The pad 134 is moveable between a closed position and an open position.

Preferably, the pad 134 is biased to the open position unless moved to the closed position by an external force. As shown in FIGS. 9–10, the pad 134 can be contacted by the actuator 30a and moved by the actuator 30a from an open position to a closed position.

As shown in FIG. 10, the pad 134 is shown in the open position. Specifically, the pawl 31 contacts the outer surface 44a of the drive spindle 40a. In this position, the first end 33 does not contact the pad 134, but rather the first notch 82, and, as a consequence, the light lock driver 80a is locked and not rotatable by the drive gear portion 102. Further, it is presumed that the film spool is not properly parked and no electrical connection is made between the first contact point 128a and the second contact point 132a.

As shown in FIG. 9, the pad 134 is shown in the closed position. Specifically, the pawl 31 contacts the inner surface 42a of the drive spindle 40a. In this position, the first end 33 does not engage the first notch 82, but rather contacts the contact pad 128, pushing the contact pad 128 into the closed position. As a consequence, the light lock driver 80a is unlocked and rotatable by the drive gear portion 102. Further, it is presumed that the film spool is properly parked and an electrical connection is made between the first contact point 128a and the second contact point 132a. It should be appreciated that the parking switch 120 is only turned "on" when the film spool is properly parked.

It should also be appreciated that the alternative embodiment of the parking switch 120a can be used to backup or replace the sensor and radial bar code mechanism and method generally used to park the film spool. For example, a control mechanism (not shown) can monitor the parking switch 120a. When the parking switch 120a turns "on" (thereby indicating the film spool is positioned to be properly parked), the control mechanism can brake a drive mechanism (not shown) used to rotate the drive spindle 40a. As a consequence, the drive spindle 40a ceases to rotate and the film spool becomes stationary in a position indicating that the film spool is properly parked.

It should also be appreciated that the alternative embodiment of the parking switch 120a can be used to count film spool rotations. For example, the parking switch turns "on" once every complete rotation of the drive spindle 40a. As one rotation of the drive spindle 40a corresponds to one rotation of the film spool, the parking switch 120 can be used as a counter based on the number of times the parking switch 120a turns "on."

The foregoing description of the present invention has been presented for purposes of illustration and description. The description is not intended to limit the invention to the form disclosed herein. Consequently, the invention and modifications commensurate with the above teachings and skill and knowledge of the relevant art are within the scope of the present invention. The preferred embodiment described above is also intended to explain the best mode known of practicing the invention and to enable others skilled in the art to utilize the invention in various embodiments and with the various modifications required by their particular applications for use of the invention. It is intended that the appended claims be construed to include all alternative embodiments as permitted by the prior art.

Parts List For FIGS. 1–10:

10 photographic system
20 drive lever
21 switch
22 arm
23 drive mechanism

-continued

Parts List For FIGS. 1–10:

24 hook
26 drive lever pivot point
30 actuator
31 pawl
32 slot
33 first end
34 first tab
36 second tab
37 actuator spring
38 actuator pivot point
39 curved surface
40 drive spindle
42 inner surface
44 outer surface
46 cutout surface
48 second outer surface
50 film door
60 slider door release
62 latch pin
64 ramp tab
68 door latch
70 detent lever
72 first notch
74 detent lever pivot point
80 light lock driver
82 first notch
90 latch plate
100 drive gear assembly
102 drive gear portion
104 shaft
106 first gear
108 driver spring
110 latch switch
120 parking switch
122 parking lever
123 pin
124 lever pivot point
126 parking spring
127 first end
128 first contact point
130 coil
132 second contact point
134 pad

What is claimed is:

1. A photographic system for receiving a film cartridge containing film wound about a film spool, said photographic system comprising:

a film door for covering a loading chamber for receiving a film cartridge, said film door being moveable between an open position and a closed position;

a mechanism for locking said film door in said closed position;

a film door release moveable for unlocking said film door;

a drive spindle for engaging a film spool of a film cartridge and rotating the film spool, said drive spindle including a first inner surface and a first outer surface;

a pivoted drive lever engageable by said film door release to be pivoted in accordance with movement of said film door release in a direction to unlock said film door;

an actuator engageable by said drive lever to be rotated in accordance with pivoting of said drive lever when said film door release moves in said direction to unlock said film door; and said actuator being engaged with either said first inner surface or said first outer surface, depending on a rotational position of said drive spindle, said actuator being prevented from being rotated by said drive lever when said actuator engages said first outer surface of said drive spindle, whereby preventing rotation of said actuator is effective to prevent pivoting of said drive lever and thereby to prevent movement of said film door release sufficient to unlock said film door.

2. A photographic system as set forth in claim 1, wherein said actuator comprises a first tab for engaging said drive lever and a second tab for engaging said first inner surface or said first outer surface of said drive spindle.

3. A photographic system as set forth in claim 1, further comprising a light lock driver rotatably supported by said actuator.

4. A photographic system as set forth in claim 1, wherein said actuator is permitted to be rotated by said drive lever when said actuator engages said first inner surface of said drive spindle.

5. A photographic system as set forth in claim 4, further comprising:

a second inner surface and a second outer surface on said drive spindle;

a switch having a lever for actuating said switch, said lever contacting said second outer surface when said actuator engages said first outer surface and said lever being aligned with said second inner surface when said actuator engages said first inner surface, whereby movement of said lever into alignment with said second inner surface actuates said switch when said drive spindle has been positioned to permit unlocking of said film door.

6. A photographic system as set forth in claim 1, further comprising:

a drive mechanism for said drive spindle; and a switch, actuateable upon movement of said film door release in a direction to unlock said film door, to deactivate said drive mechanism.

7. A photographic system for receiving a film cartridge containing film wound about a film spool, said photographic system comprising:

a film door for covering a loading chamber for receiving the film cartridge, said film door moveable between an open position and a closed position;

a mechanism for locking said film door in said closed position;

a film door release moveable for unlocking said film door;

a drive spindle for engaging a film spool of a film cartridge and rotating the film spool, said drive spindle including an inner surface and an outer surface;

a light lock driver, operatively connected to said film door release and rotatable in accordance with movement of said film door release in a direction to unlock said film door;

a pivoted actuator engageable with said light lock driver to prevent rotation of said light lock driver in accordance with movement of said film door release in said direction to unlock said film door; and said actuator being engaged with either said inner surface or said outer surface, depending on a rotational position of said drive spindle, said light lock driver being prevented by said actuator from being rotated when said actuator engages said outer surface of said drive spindle, whereby preventing rotation of said light lock driver is effective to prevent movement of said film door release sufficient to unlock said film door.

8. A photographic system as set forth in claim 7, wherein said light lock driver is permitted to be rotated when said actuator engages said inner surface of said drive spindle.

9. A photographic system as set forth in claim 7, wherein said actuator is spring biased into engagement with said drive spindle.

10. A photographic system as set forth in claim 7, wherein said light lock driver comprises a notch; and said actuator comprises a pawl for engaging said drive spindle and an end for engaging said notch.

11. A photographic system as set forth in claim 7, further comprising:

a switch having a pad movable to actuate said switch, said pad contacting said actuator when said actuator engages said inner surface, whereby movement of said actuator into engagement with inner surface actuates said switch when said drive spindle has been positioned to permit unlocking of said film door.

12. A photographic system as set forth in claim 7, further comprising:

a first gear operatively engaged with said film door release so that said first gear rotates upon movement of said film door release in said direction to unlock said film door;

a shaft driven by said first gear; and a second gear driven by said shaft, said light lock driver being operatively engaged with said second gear.

13. A photographic system as set forth in claim 7, further comprising:

a drive mechanism for said drive spindle; and a switch, actuateable upon movement of said film door release in a direction to unlock said film door, to deactivate said drive mechanism.

14. A method for operating a photographic system including a film door for coveting a loading chamber for receiving a film cartridge containing film wound about a film spool, said film door being moveable between an open position and a closed position; a mechanism for locking said film door in said closed position; a film door release moveable for unlocking said film door; a drive spindle for engaging the film spool of the film cartridge and rotating the film spool; and a drive mechanism for said drive spindle, said method comprising steps of:

upon movement of said film door release in a direction for unlocking said film door, deactivating said drive mechanism to leave said drive spindle in a stationary position;

determining from said stationary position whether the film spool is properly parked with the film fully drawn into the cartridge; and preventing movement of said film door release when the film spool is not properly parked.

* * * * *